United States Patent
Eric et al.

(10) Patent No.: US 6,791,219 B1
(45) Date of Patent: Sep. 14, 2004

(54) CONTACTLESS ELECTRO-MECHANICAL ACTUATOR WITH COUPLED ELECTRONIC MOTOR COMMUTATION AND OUTPUT POSITION SENSORS

(75) Inventors: Seger Eric, Rockford, IL (US); Frederick L. Gary, Rockford, IL (US)

(73) Assignee: BVR Technologies Company, Rockford, IL (US)

(*) Notice: Subject to any disclaimer, the term of this patent is extended or adjusted under 35 U.S.C. 154(b) by 0 days.

(21) Appl. No.: 10/464,684

(22) Filed: Jun. 18, 2003

(51) Int. Cl.[7] .................................................. H02K 7/00
(52) U.S. Cl. ........................................ 310/68 B; 310/83
(58) Field of Search ................................ 310/68 B, 83, 310/68 R, 80, 75 R

(56) References Cited

U.S. PATENT DOCUMENTS

| | | | |
|---|---|---|---|
| 3,946,298 A | 3/1976 | van de Loo | 318/685 |
| 4,232,451 A | 11/1980 | Thomsen | 33/361 |
| 4,492,906 A * | 1/1985 | Goto et al. | 318/488 |
| 4,785,242 A * | 11/1988 | Vaidya et al. | 324/207.25 |
| 5,101,143 A | 3/1992 | Eba | 318/11 |
| 5,367,237 A | 11/1994 | Ring et al. | 318/616 |
| 5,422,551 A | 6/1995 | Takeda | 318/265 |
| 5,545,961 A | 8/1996 | Peter | 318/647 |
| 5,598,073 A | 1/1997 | Hans | 318/431 |
| 5,622,096 A | 4/1997 | Granberg | 92/5 R |
| 5,659,230 A | 8/1997 | Fukuoka | 318/256 |
| 5,990,586 A | 11/1999 | Milano | 510/75 R |
| 6,002,226 A | 12/1999 | Collier-Hallman | 318/639 |
| 6,091,220 A | 7/2000 | Redelberger | 318/653 |
| 6,097,123 A | 8/2000 | Weiss | 310/105 |
| 6,104,152 A | 8/2000 | Coles | 318/256 |
| 6,124,688 A | 9/2000 | Coles | 318/256 |
| 6,198,243 B1 | 3/2001 | Ritmanich | 318/466 |
| 6,229,299 B1 | 5/2001 | Strashny | 324/174 |
| 6,408,573 B1 | 6/2002 | Fukumoto | 49/360 |
| 6,448,760 B1 | 9/2002 | Neumann | 324/207.2 |
| 6,480,130 B1 | 11/2002 | Hanson | 341/144 |

* cited by examiner

Primary Examiner—Dang Le
(74) Attorney, Agent, or Firm—Keith Frantz

(57) ABSTRACT

An electromechanical actuator includes a brushless motor driving an output shaft through a torque-amplifying geartrain. An integrated motor commutation sensor includes an annular, two-pole magnet rotating with the motor and two ratiometric Hall-effect sensors at right angles around the magnet. The sensor signals are utilized by a processor to compute motor angle over 360 degrees rotation. An integrated output position sensor includes a second annular magnet rotating with the output shaft, and a second pair of Hall-effect sensors providing signals to the processor for computation of output shaft absolute position. The commutation magnet angle is predicted from the output shaft position, and compared to the motor's sensed rotational angle. The difference is used to correct the output shaft sensed angle with improved accuracy proportional to the gear ratio. The processor also provides logic signals to control motor winding current and provide closed-loop control of actuator position.

22 Claims, 5 Drawing Sheets

CONTACTLESS ELECTRO-MECHANICAL ACTUATOR WITH COUPLED ELECTRONIC MOTOR COMMUTATION AND OUTPUT POSITION SENSORS

CROSS-REFERENCE TO RELATED APPLICATIONS

None

REFERENCE TO SEQUENCE LISTING, TABLE, OR COMPUTER PROGRAM LISTING APPENDIX SUBMITTED ON A COMPACT DISC

N/A.

STATEMENT REGARDING FEDERALLY SPONSORED RESEARCH OR DEVELOPMENT

N/A.

BACKGROUND OF THE INVENTION

1. Field of Invention

This invention relates generally to electromechanical actuators of the type having an electric motor driving a rotary output shaft through a torque amplifying gear train.

More specifically, the invention relates to an electromechanical actuator with a brushless motor and contactless angular position sensors that provide both motor commutation signals and output shaft angular position signals to achieve a high-reliability, precision actuator.

2. Background Art

Electromechanical actuators have historically utilized AC or brush DC motors with potentiometers for feedback. Brushes in the motors and wipers in the potentiometers have led to limited life and low reliability for these types of actuators. More recently, the trend in precision electromechanical actuators is to utilize a brushless DC motor with a resolver, optical encoder, or switching Hall-effect device for motor commutation, a gear reducer for torque amplification, and a resolver, optical encoder, or rotary-variable-differential-transformer (RVDT) for sensing the angular position of the output shaft. These output shaft position feedback sensors are typically self-contained units driven by gears off the actuator output shaft. They are also substantially more expensive than conventional potentiometers, often requiring AC excitation and demodulation electronics to obtain useable output signals, and/or are unreliable in low temperature, moist environments. Consequently, precision actuators utilizing these types of sensors are generally more complicated and more expensive than actuators with more conventional potentiometer feedback.

Recent efforts to achieve lower-cost, yet reliable and accurate electromechanical actuators have included use of integrated contactless magnetic field sensor elements such as Hall-effect devices or magnetoresistive (MR) sensors. These sensor elements are relatively low cost, and are capable of generating electrical output signals when exposed to a rotating magnetic field. Hall-effect sensors utilize a current-carrying semi-conductor membrane to generate a low voltage perpendicular to the direction of current flow when subjected to a magnetic field normal to the surface of the membrane. Magnetoresistive sensors utilize an element whose resistance changes in the presence of a changing external magnetic field.

One group of prior electromechanical actuators utilize integrated Hall-effect sensors to provide signals that are digital in nature, generating pulses as a function of shaft rotation, or discrete signals for incremental shaft angles. These digital signals are generally developed by sensing the passage of notches, magnets, saturating magnet poles, or other discrete signal generating arrangements on a rotating shaft, and are used for motor commutation and/or actuator output shaft position sensing in the actuator. For example, Takeda et al., U.S. Pat. No. 5,422,551 uses Hall-effect sensors to generate pulse signals for motor control in a power window drive mechanism. Collier-Hallman et al., U.S. Pat. No. 6,002,226 uses Hall-effect sensors to generate pulse signals for motor control in an electric power steering system. Integrated Hall-effect sensors generating digital control signals are also shown in the motor controls of Coles et al., U.S. Pat. Nos. 6,104,152 and 6,124,688; Redelberger, U.S. Pat. No. 6,091,220; and Hans et al., U.S. Pat. No. 5,598,073. In Ritmanich et al., U.S. Pat. No. 6,198,243, integrated Hall-effect devices generate a pulsed output from rotation of an actuator output shaft for stepper motor control. As noted above, actuator and motor controls utilizing integrated magnetic field sensors as digital signal generators often require pulse-width modulation, or are otherwise relatively complicated to obtain, process and utilize the digital output signals from the sensors. And the accuracy of such devices is limited by the number of pulses per revolution developed from the sensed rotating element.

Another group of prior electromechanical actuators utilize integrated Hall-effect devices to produce analog signals indicative of the angular position of the output shaft for closed-loop control of the actuator. Electromechanical actuators of this type are shown in Peter et al., U.S. Pat. No. 5,545,961, Weiss et al., U.S. Pat. No. 6,097,123, and Fukumoto et al., U.S. Pat. No. 6,408,573. In general, these include annular magnets provided with sets of alternating N-pole/S-pole combinations coupled to the rotary output elements of the actuator, and Hall-effect sensors arranged around the magnet to produce analog output signals that are processed to obtain the angular position of the output element. Although capable of sensing angular position through 360 degrees of rotation, the accuracy of these types of actuators is limited to the accuracy of the Hall-effect sensing elements, which is currently, typically in the neighborhood of ±2 degrees, without provisions for special magnet magnetization processes, special sensor configurations, temperature compensation or reference calibration.

To advance the electromechanical arts, and to address the above-identified drawbacks of prior actuators of the same general type, there is a need for an improved electromechanical actuator that is capable of accurately controlling the angular position of a rotary output shaft, with the high reliability and long life available with the use of a brushless motor and contactless sensors, but without the high cost and complexity associated with use of resolver, encoders, or RVDTs. There is also a need for an improved accurate, high-reliability actuator that can be economically manufactured and compactly packaged.

For detailed discussion of position sensor configurations utilizing such magnetic field sensor elements, reference is made to Frederick et al, U.S. patent application Ser. No. 10/087,322, filed Feb. 28, 2002, and Seger et al, U.S. patent application Ser. No. 10/367,459, filed Feb. 14, 2003, both of which are assigned to the assignee of the present invention, and the discussions of which are incorporated herein by reference.

SUMMARY OF THE INVENTION

An important objective of the present invention is to provide an improved electromechanical actuator which can precisely control the angular position of an output shaft, but which is economical to manufacture.

Another important objective of the invention is to provide an actuator without motor and sensor contacts, brushes and wipers to improve actuator life and reliability as compared with many prior economical actuators of the same general type.

Another important objective of the invention is to provide an actuator that accurately computes and controls the position of the output shaft with enhanced accuracy without the high cost and complexity associated with use of resolver, encoders, RVDTs and like sensor components of many prior precision actuators.

Another important objective of the invention is to provide the foregoing high-reliability, accurate actuator in a compact package utilizing economical, standard components.

A detailed objective is to achieve the foregoing by providing an electromechanical actuator with high-reliability contactless brushless motor and contactless angular position sensing elements comprising simple magnets and magnetic field sensing elements to produce both motor commutation signals and shaft position signals.

Another detailed object is to achieve a compact actuator design by integrating the functional motor and sensor components around a common axis of rotation.

Another detailed objective is to use both the motor commutation signals and output shaft position signals in a unique algorithm to achieve enhanced precision control of the angular position of the output shaft.

These and other objectives and advantages of the invention will become apparent from the following detailed description when taken in conjunction with the accompanying drawings.

The objectives of the invention are accomplished in one preferred embodiment actuator with a brushless electric motor, an integrated motor commutation sensor comprising an annular two-pole magnet connected to rotate with the motor shaft and a pair of ratiometric Hall-effect devices for sensing the angular position of the magnet, a step-down geartrain coupled between the motor shaft and an output shaft (i.e., a rotatable output element), an integrated output shaft position sensor comprising a second annular two-pole magnet connected to rotate with the output shaft and a second pair of ratiometric Hall-effect devices for sensing the angular position of the output shaft magnet, and a digital-signal processor-based sensor computation and motor control circuit. The Hall-effect devices sense the magnetic field of each magnet as it rotates and provide output signals indicative of the angular position of the magnet over a full 360 degrees of rotation. A controller module computes the precise angle of the output shaft from the sensed positions of the magnets, compares the computed output shaft angle with an input position command, and provides logic signals to a motor power controller module to energize the appropriate motor windings and turn the motor in the direction necessary to drive the output shaft towards the commanded position.

As in any closed-loop control system, the accuracy of the actuator is primarily dependent upon the accuracy of the output shaft position sensing system. In the present invention, a highly accurate position sensing system is implemented economically and compactly by adding a pair of magnets and associated magnetic field sensors, wherein one magnet is connected to the motor shaft, the second magnet is connected to the output shaft, and rotation of the two magnets is coupled by the step-down ratio of the actuator geartrain such that the motor shaft rotates multiple revolutions for one turn of the output shaft.

With this arrangement, the output shaft magnet is used to generate signals to calculate a coarse indication of output shaft angle. In other words, the sensed angle of the output shaft magnet, as calculated by the digital signal processor, provides an indication of output shaft angle within the sensing accuracy of the magnet and magnetic field sensors. Current state-of-the-art in standard magnets and solid-state flux sensors can typically provide an indication of shaft angle within ±2 degrees over 360 degrees of rotation and −54 to 125° C. of temperature variation without special magnetization or sensor configurations, electronic temperature compensation, or reference calibration data. Since the angular rotation of the motor shaft magnet can be sensed with the same degree of accuracy, and its rotational angle is a fixed multiple of the angular rotation of the output shaft, the sensed position of the motor shaft magnet can be used to obtain a more accurate indication of the output shaft angle with an improvement in accuracy approximately proportional to the interconnecting gear ratio.

To compute the precise angular position of the output shaft, i.e., to compute the angular position of the output shaft with the improved accuracy, the sensed angular position of the output shaft magnet is used to provide an absolute measure of the output shaft position at all motor shaft angles, and to predict the angle of the motor shaft as calculated by multiplying the sensed angle of the output shaft magnet by the gear ratio. The difference in the calculated angles of the two magnets is then divided by the gear ratio to obtain a correction factor that is applied to the sensed angle of the output shaft to compute a more precise output shaft position. Alternately, the angle of the output shaft magnet is utilized to count the number of complete turns of the motor shaft magnet, the result of which is added to the sensed angle of the motor shaft magnet. This total motor shaft rotation is divided by the gear ratio to provide an accurate measure of output shaft angle. Thus, the position of the output shaft is accurately computed as a function of the sensed positions of both the output shaft magnet, the motor shaft magnet, and the gear ratio connecting the two magnets. In implementing this aspect of the invention, the gear ratio between the magnets must be less than 360 degrees divided by the maximum position sensing error of the output shaft magnet to accurately predict the number of revolutions the motor shaft has traversed. Alternately stated, the step-down ratio must be less than the inverse of the accuracy in parts per hundred for which the rotational angle of the output shaft magnet can be sensed.

In the preferred embodiment actuator, a circular or annular magnet is fixed to or around the motor shaft. This configuration allows the shaft, or an extension therefrom, to extend through the center of the magnet for ease of attachment, and for compact packaging of the magnet in the actuator. The preferred magnet, made from ALNICO or samarium cobalt material or comparable material chosen for thermal stability, is magnetized with two poles 180 degrees apart on its outer radial surface or end face to establish a uniformly and periodically varying magnetic field as the magnet is rotated. The magnetic field sensors are positioned proximate the magnet to sense different non-saturating components of the varying magnetic field as the magnet rotates, and provide periodic phase-shifted or differential voltage signals indicative of and preferably proportional to the strength of the magnetic field sensed.

The Hall-effect devices are preferably angularly spaced 90 degrees from each other around the magnet, or otherwise positioned at operative right angles to each other, to sense orthogonal components of the periodically varying magnetic field, and to provide generally sinusoidal output voltage signals that are phase shifted 90 degrees from one another. This enables calculation of the sensed angular position of the magnet over 360 degrees rotation from the arctangent function of the ratio of the output signals from the sensors. These calculations are accomplished by the processor executing an arctangent function, or a single tracking observer or other algorithm commonly used to calculate a non-ambiguous angle from sine or cosine type signals. Alternately, for example, the magnetic field sensors may comprise a pair of magnetoresistive sensor elements having their magnetically sensitive axes at right angles to each other to develop periodically varying differential voltages indicative of and from which the angular position of the magnet is calculated.

The output shaft is provided with a second, similar annular magnet and associated magnetic field sensor set through the step-down geartrain which causes the output shaft magnet to rotate through one revolution as the motor shaft is turned through multiple revolutions. In the preferred embodiment, this is accomplished with a multiple-stage simple planetary geartrain with a typical overall step-down ratio of between 20-to-1 and 80-to-1. The step-down ratio is preferably an integer to maintain a direct relationship between the position of the output shaft sensor and the motor shaft sensor. If the step-down ratio is a non-integer, the output shaft rotation would normally be limited to not exceed 360 degrees to avoid the need to establish a datum or zero point with regard to the output shaft and motor shaft sensors. The multiple-stage planetary geartrain allows for an extremely compact actuator by enabling location of the output shaft magnet near the motor and controller electronics at the end of the actuator opposite the coupling between the output shaft and the load, and securing the output shaft magnet to a rod that passes through the center of the motor and geartrain and is secured at its other end to the output shaft.

The analog voltage signals from the magnetic field sensors are converted to digital format and utilized by the processor to calculate the sensed rotational angles of the individual magnets, and compute the precise angular position of the output shaft. As noted above, the processor also provides or uses the computed output shaft angle as an actuator position feedback signal to establish logic signals for control of the current in the motor windings and closed-loop position control of the actuator output shaft in response to the input command signal. If the input command includes target output shaft rotational time derivative parameters (i.e., rotational speed and/or acceleration information), the processor is further configured to calculate the applicable time derivatives from the rate of change of the sensed positions of the magnets, precisely compute the associated time derivative of the output shaft angle as a function thereof and the step-down gear ratio of the geartrain, compare the computed output shaft time derivative with the input command, and provide control signals to the motor control module for commutating the motor and controlling the subject time derivative of the output shaft. Overall, this arrangement uses simple calculations based on the sensed angular positions of the magnets and the gear ratio to precisely control the output shaft, and allows the sensing elements to be conveniently and compactly packaged around a central axis of the actuator.

DETAILED DESCRIPTION OF THE INVENTION

Figure 1:
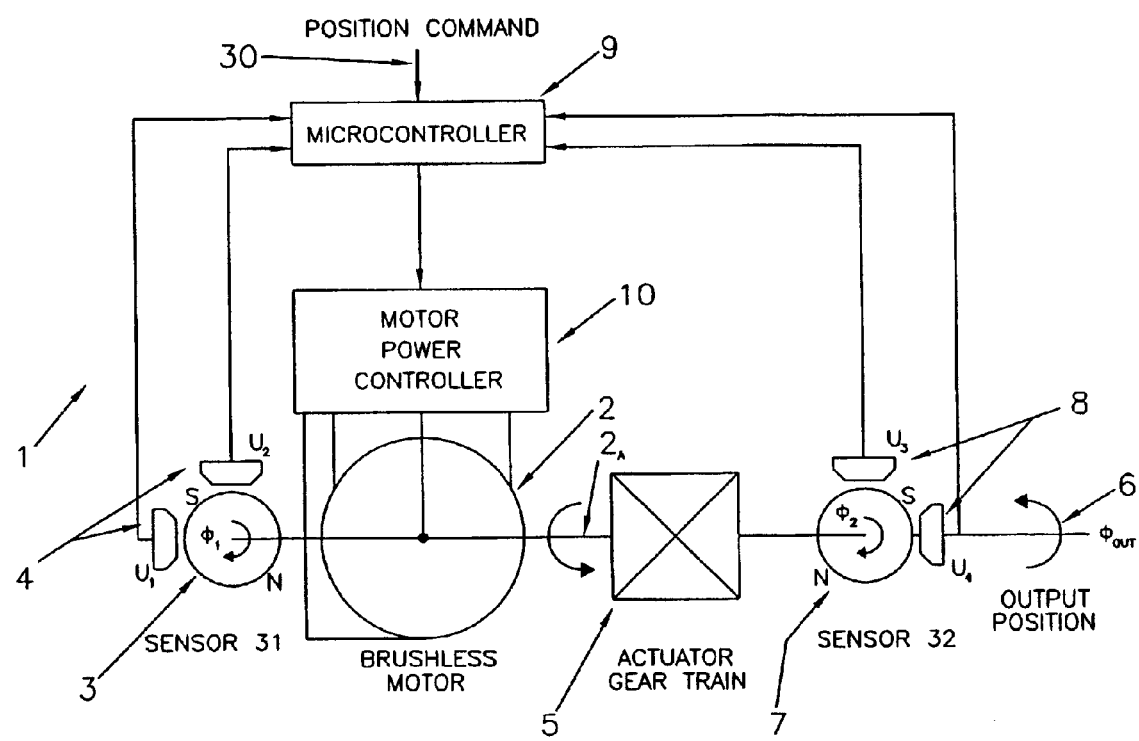
FIG. 1 is a block diagram of an electromechanical actuator in accordance with the invention, including a brushless rotary motor driving a geartrain and output shaft, angular position sensors for motor commutation and output shaft position sensing connected through the actuator gear train, and a microcontroller module and motor power control module.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 is a block diagram of an electromechanical actuator 1 in accordance with the present invention. The actuator includes a brushless motor 2 with a motor shaft 2A, a motor shaft sensor magnet 3, motor shaft magnetic field sensors 4, an actuator geartrain 5, an output shaft 6, an output shaft sensor magnet 7, output shaft magnetic field sensors 8, and a control circuit including a microcontroller module 9 and a motor power controller module 10. The sensor magnet 3 is connected to rotate with the motor shaft, and the sensor magnet 7 is connected to rotate with the output shaft. The actuator geartrain is coupled between the motor shaft and output shaft, and is driven by the motor shaft to cause rotation of the output shaft and drive a load (not shown) coupled thereto in response to an input command signal 30 supplied to the microcontroller. The input command signal typically contains position command information that corresponds to a desired or target output shaft position. In FIG. 1, the motor shaft magnet 3 and magnetic field sensors 4 are indicated by dashed lines as comprising a motor shaft commutation sensor 31, and the output shaft magnet 7 and magnetic field sensors 8 are indicated by dashed lines as comprising output shaft angular position sensor 32, the components of which are integrally packaged in the actuator.

The geartrain 5 is a torque amplifying geartrain which causes the output shaft 6 to rotate one revolution for several rotations of the motor shaft 2A as established by the step-down gear ratio of the geartrain. Consequently, the output shaft magnet 7 rotates one revolution for several rotations of the motor shaft magnet 3 as established by the step-down gear ratio. This arrangement enables the output shaft magnet and magnetic field sensors 8 to provide a coarse, or absolute, indication of the angle of the output shaft 6, and the motor shaft magnet and magnetic field sensors 4 to be utilized as a fine, or precision, indication of the output shaft angle, as well as for motor commutation purposes. The sensor magnets 3 and 7 typically have two poles 180 degrees apart to provide a periodic variation in magnetic field as they rotate on their respective shafts. The rotating magnetic fields are sensed by the magnetic field sensors 4 and 8 located proximate the magnets. These magnet field sensors 4 and 8 comprises a pair of magnetic field sensor elements $U_1$, $U_2$, and $U_3$, $U_4$, respectively, associated with the sensor magnets 3 and 7. The individual magnetic field sensor elements of each sensor pair 4 and 8 are located 90 degrees from each other around the axis of rotation of each magnet to sense orthogonal components of the rotating magnetic fields, and to provide output voltages generally proportional to the strength of the magnetic field sensed. A second pair of sensor elements can be located around each magnet where it is desired to provide redundancy and improve overall reliability.

The output voltage signals from the magnetic field sensors 4 and 8 are converted to digital format by electronic analog to digital converters which are shown on FIG. 1 as integral to microcontroller module 9. These digital signals are utilized by the microcontroller to calculate the angle of rotation ($\emptyset_1$) of magnet 3 and the angle of rotation ($\emptyset_2$) of magnet 7, and to compute a precise measurement of the angle ($\emptyset_{OUT}$) of the output shaft 6 using the sensed angle ($\emptyset_2$) of output shaft magnet 7 as a coarse indication of the output shaft angle and the sensed angle ($\emptyset_1$) of the motor shaft magnet 3 as a fine reference, along with any error correction data stored as a result of the actuator calibration. The microcontroller then compares the precisely computed angle of the output shaft with the position command signal 30 to determine the appropriate signals to the motor power controller 10 to drive the motor shaft 2A in the direction required to precisely achieve the commanded angle at the output shaft.

Figure 2:
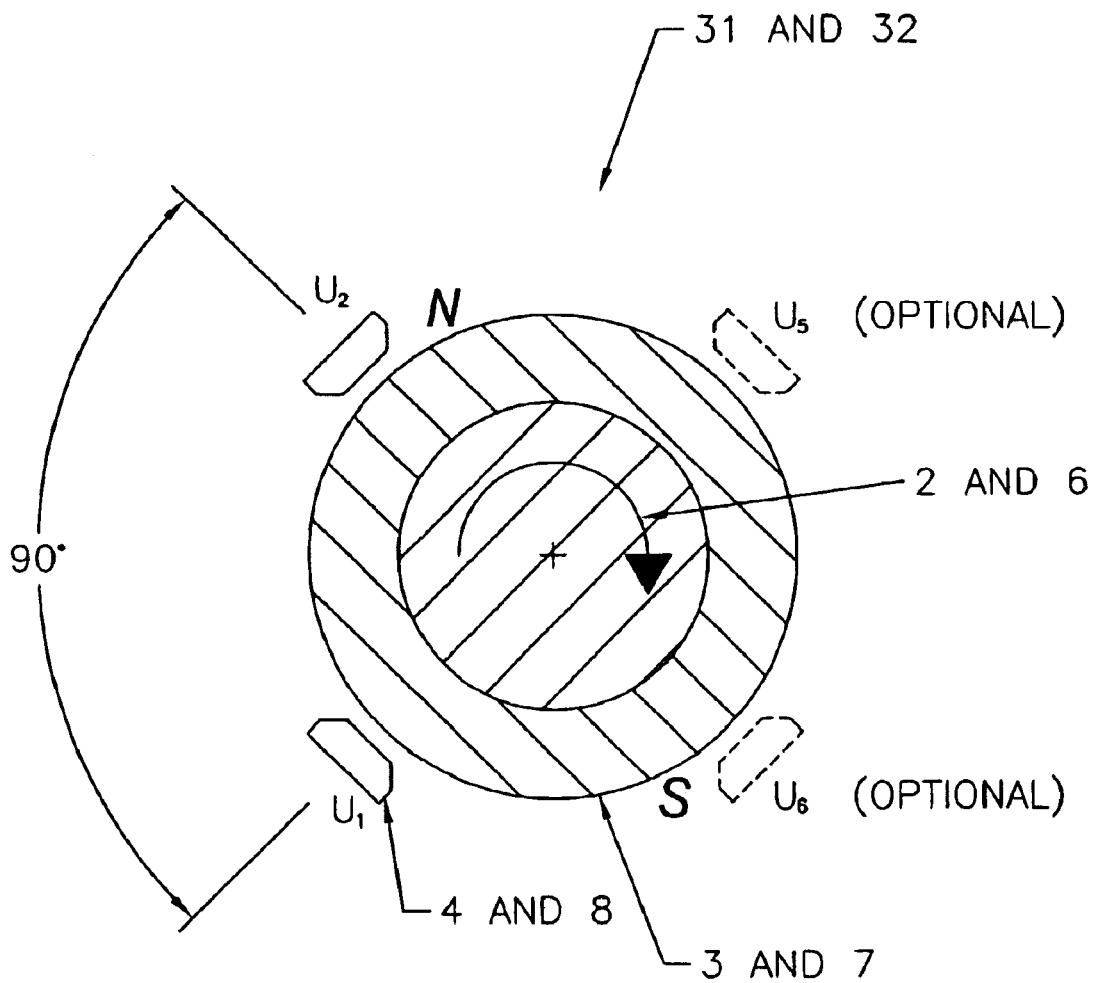
FIG. 2 is a fragmentary cross-sectional view of an angular position sensor of FIG. 1 including a rotating angular magnet and two ratiometric Hall-effect sensors as viewed perpendicular to the axis of rotation of the magnet.

FIG. 2 presents a preferred embodiment for the motor and output shaft sensor magnets 3 and 7 and the associated magnetic field sensors 4 and 8 as viewed perpendicular to the axis of rotation of the magnets. The preferred magnet configuration is circular in outer profile, with two radial poles designated as "N" and "S" 180 degrees apart to establish a periodically varying magnetic field at a radial distance from the magnet it rotates. A magnet material which has low sensitivity to temperature, such as ALNICO or samarium cobalt, is preferred for good stability of magnetic field strength. The preferred magnets are further configured as annular magnets to allow shafts to extend through the centers of the magnets for ease of attachment and compact packaging. Although not a requirement of this invention, selection of the ratio of the outside diameter of the magnet to its inside diameter, and magnetizing the magnets as described in Frederick, et al, U.S. patent application Ser. No. 10/087,322, filed Feb. 28, 2002 which is assigned to the assignee of the present application, will provide additional improvements in overall sensor accuracy.

The preferred magnetic field sensors 4 and 8 each comprise a pair of ratiometric Hall-effect devices indicated as $U_1$, $U_2$ and $U_3$, $U_4$, respectively, with the sensor elements of each pair located 90 degrees from each other at a fixed distance around the outside diameter of the associated magnets 3 and 7 to sense orthogonal components of the rotating magnetic fields. Alternately, the magnetic field sensor associated with each magnet may be magnetoresistive bridge sensors having magnetically sensitive axes at right angles to each other. The radial space between the magnetic field sensitive area of the sensors and the outside diameter of the magnets is established to prevent saturation of the sensors when subjected to the maximum magnetic field strength created by the presence of a pole aligned therewith. Although not required for this invention, this magnet and sensor configuration allows room for a second set of sensors $U_5$, $U_6$ associated with each magnet when desired for signal redundancy and improved reliability, and for interfacing with a redundant set of computational circuitry.

Figure 3:
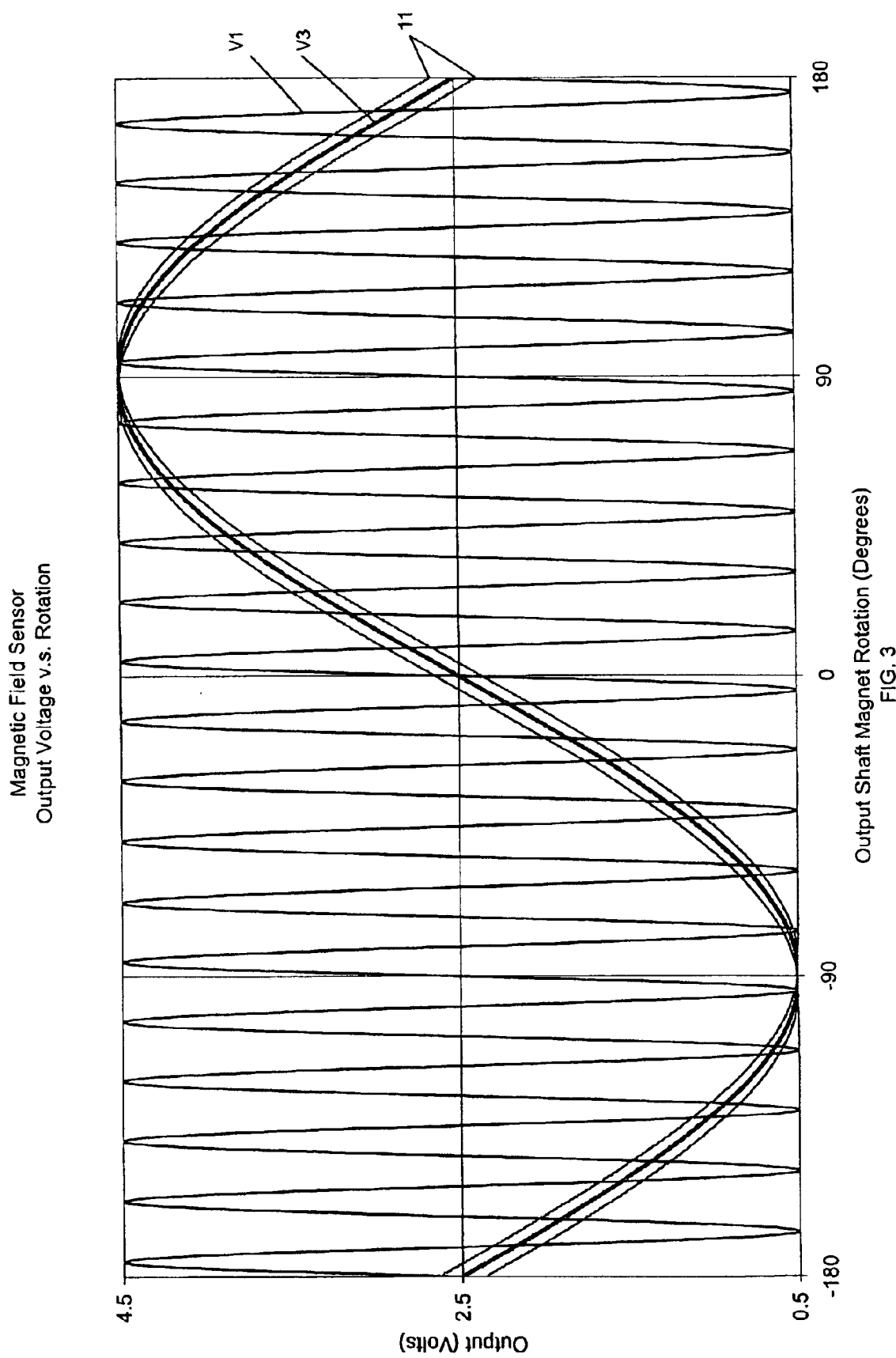
FIG. 3 is a graphical representation of typical output voltages from individual magnetic field sensor elements of the angular position sensor of FIG. 2 as connected to either the motor shaft or the output shaft.

FIG. 3 presents a plot of typical, generally sinusoidal, output voltages from a single Hall-effect device ($U_3$) located in a nonsaturating magnetic field around sensor magnet 3, and a single Hall-effect device ($U_3$) located in a nonsaturating magnetic field of the same maximum strength around sensor magnet 7, when the motor shaft magnet 3 rotates through twenty revolutions and is connected to the output shaft magnet 7 through a 20 times step-down geartrain for a corresponding single revolution of the output shaft 6. Output voltage versus rotation for the other Hall-effect device associated with each magnet will be similar but shifted 90 degrees in phase. As shown in FIG. 3, worst case sensing error 11, as a function of operating temperature effects on the magnets and sensors and residual mechanical zero shift between the magnets is typically on the order of ±2 degrees before error correction. In determining the precise angle $\emptyset_{OUT}$ of the output shaft 6, the output shaft magnet 7 is used to provide an absolute reference, and its sensed angle $\emptyset_2$ can be used to predict the number of turns traversed by the motor shaft magnet 3 with an uncertainty in degrees equal to its worst case error multiplied by the ratio of the interconnecting geartrain 5. For sensed accuracy of ±2 degrees and a gear ratio of 20, this equals:

$$\pm 2 \text{ degrees} \times 20 = \pm 40 \text{ degrees of uncertainty.}$$

Since this uncertainty is less than 360 degrees, the exact number of revolutions that the motor shaft magnet 3 has rotated, and the corresponding rotation of the output shaft, is known to the sensed accuracy of the motor shaft magnet, resulting in an accuracy improvement proportional to the ratio of the step-down geartrain. For a 20:1 interconnecting geartrain, the improved accuracy equals:

$$\pm 2 \text{ degrees}/20 = \pm 0.1 \text{ degrees over 360 degrees rotation of output shaft.}$$

Figure 4:
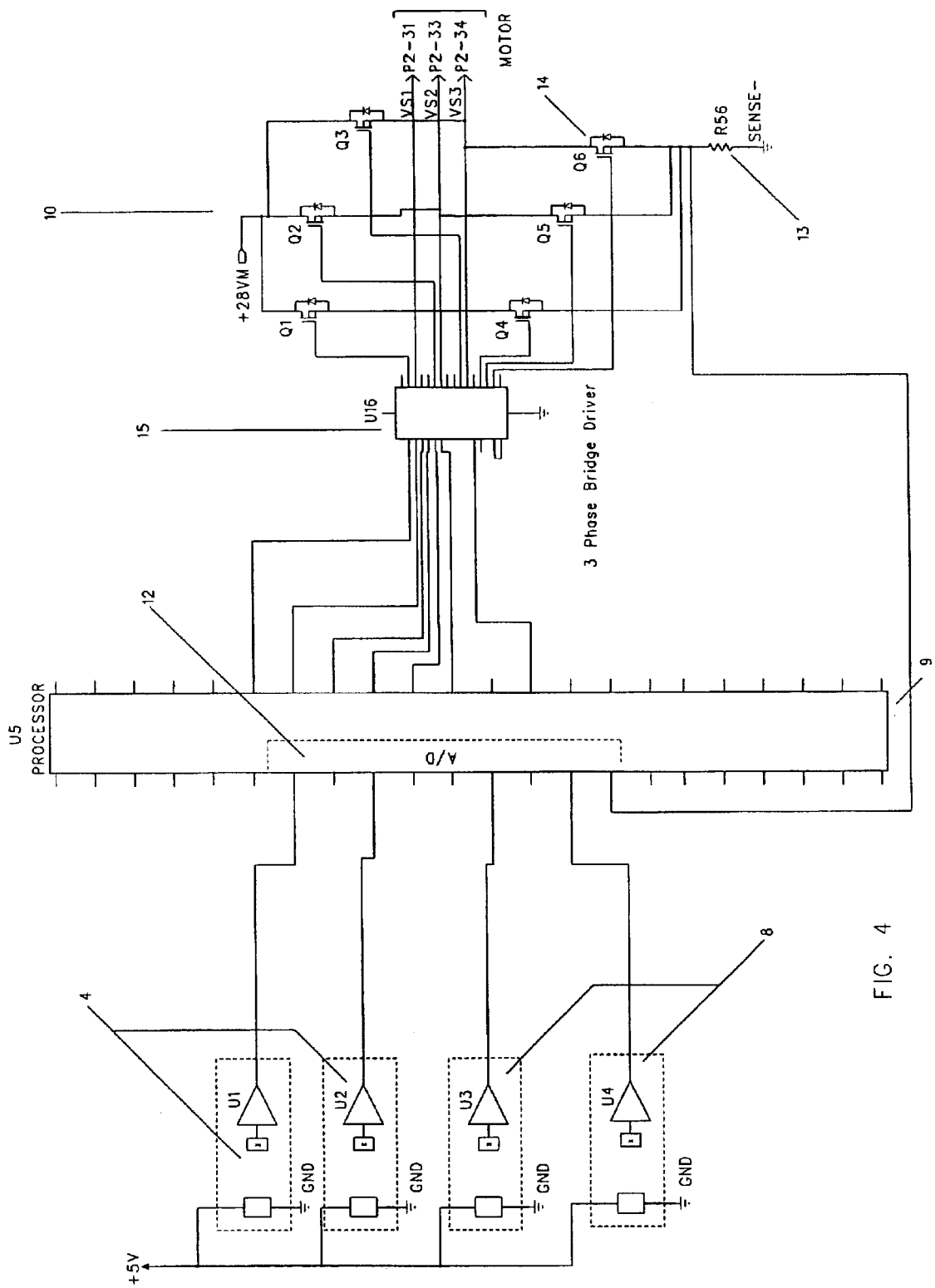
FIG. 4 is a schematic diagram of a sensing and computational circuit suitable to produce an accurate, digital electronic representation of motor and output shaft rotation angles, and to provide for motor commutation and output shaft position and speed control.

FIG. 4 presents a simplified schematic of a microcontroller-based electronic circuit module including a digital signal processor 9 and to convert the output signals from the magnetic field sensors 4 and 8 to digital signals, calculate the sensed angular positions $\emptyset_1$ and $\emptyset_2$ of the motor and output shaft magnets 3 and 7, compute the precise angular position $\emptyset_{OUT}$ of the output shaft, and control the motor 2 to achieve an output shaft angle corresponding to the input position command 30.

The ratiometric Hall-effect sensors, such as Allegro 3518 or equivalent, provide an output which is proportional to the applied magnetic field over a ±800 Gauss range, and have a quiescent, or 0 Gauss, output of 2.5 volts with a 5.0 volt supply. These magnetic field sensors 4 and 8 are designated elements $U_1$ through $U_4$ in FIG. 4, and they have output voltages that vary periodically as the sensor magnets rotate and expose them to a varying magnetic field as shown in FIG. 3. These output voltage signals are converted to digital signals by analog to digital converters 12, which are shown integral to the digital signal processor 9 utilized for position computation and control. The digital signal processor shown is selected for its on-board analog-to-digital converters, ability to precisely compute shaft angles at high speed, ability to store shaft angle sensor error correction data, and ability to provide signals to the motor power controller module to control motor speed and torque to achieve the commanded position of the output shaft.

The digital signal processor 9 calculates the sensed angle of each magnet 3 and 7 by first subtracting out the equivalent quiescent voltage of each of the sensor's output voltages. The arctangent of the ratio of the 90-degree-out-of-phase signal pairs from the magnetic field sensors associated with each magnet is then calculated and is equivalent to the angle of rotation, between 0 and 360 degrees, of that magnet. The calculated angle of the output shaft magnet 7 multiplied by the actuator gear ratio gives an approximate calculation of the total number of turns or degrees of rotation of the motor shaft magnet. The measured number of degrees of rotation of the motor shaft magnet 3 is used to provide a more accurate indication of its angle of rotation. The total number of degrees of rotation of the motor shaft magnet, or the difference between the estimated and sensed degrees of rotation of the motor shaft magnet, is then divided by the total gear ratio to the output shaft to provide a computed angle $\emptyset_{OUT}$ of output shaft rotation with an accuracy of better than 0.1%. This accuracy can be further improved by measuring and storing the motor shaft sensor errors in the digital signal processor memory and using this stored error data for auto correction as the motor shaft turns. The precision output shaft computed angle $\emptyset_{OUT}$ and the signal from the motor current sense circuit 13 are utilized by the digital signal processor to determine the appropriate motor windings to be energized by the motor power controller 10 to drive the output shaft to the commanded position.

The power controller 10 includes a power MOSFET or transistor switch bridge 14 provided with six switches and appropriate diodes to control recirculating currents in the motor windings. A bridge driver 15 provides an interface between the logic outputs of the digital signal processor 9 and creates voltage levels adequate to turn the current switches of the switch bridge 14 on and off. Thus, the processor also calculates the shaft angles for switching logic to the electronic bridge circuit which energizes the appropriate legs of the brushless motor windings at the ideal commutation angles.

As a numeric example in computing the precise angular position of the output shaft using motor shaft full turn data, a step-down gear ratio of 20 and magnet angular position sensing accuracy of ±2 degrees are assumed, with a data point at which the sensed angular position ($\emptyset_2$) of the output shaft magnet 7 is calculated at 163±2 degrees from the arctangent function of the voltage signals from the sensor 4, and the sensed angular position ($\emptyset_1$) of the motor shaft magnet 3 is calculated at 26.5±2 degrees from the voltage signals from the sensor 8. The sensed angle of the output shaft magnet translates to an estimated 163 (±2)×20=3,260 (±40) degrees of total angular rotation of the motor shaft 2A, which corresponds to between (3,220/360=) 8.9 and (3,300/360=) 9.2 total number of turns of the motor shaft. This apparent ambiguity in the estimated number of full turns of the motor shaft is resolved to 9 full turns by virtue of the sensed position of the motor shaft magnet at 26.5±2 degrees. With this data, the total angular rotation of the motor shaft magnet is calculated at 9×360+26.5 (±2)=3,266.5 (±2) degrees, and the precise angular position ($\emptyset_{OUT}$) of the output shaft is computed at (3,266.5±2)/20=163.325±0.1 degrees.

Alternately, for example, the rotation of the motor shaft between 0 and 360 degrees is estimated from the sensed angle of the output shaft magnet as 3,260−(9×360)=20 degrees. The difference between the sensed motor shaft angle and the motor shaft angle calculated from the output shaft is equal to 26.5−20=6.5±2 degrees. Dividing this difference by the gear ratio results in a correction factor of 6.5±2/20=0.325 degrees. Since the estimated motor shaft angle of 20 degrees is less than the sensed motor shaft angle of 26.5 degrees, the correction factor is added to the sensed angle of the output shaft to compute the precise output shaft angle at 163+0.325=163.325±0.1 degrees. Of course, these overall algorithms may be implemented in the processor either with or without intermediate steps, and reference to parameters such as angular position, angle, turns, and like terms includes signals or indications representative or indicative thereof.

Thus, controlling the position of the actuator output shaft in accordance herewith generally includes—dividing the rotation of the output shaft into equal angular segments having an angular measure of 360 degrees divided by the actuator gear ratio, —determining in which one of the segments the output shaft is in from the sensed angular position of the output shaft, and the precise location of the output shaft in said one segment from the sensed angular position of the motor shaft divided by the gear ratio, —combining the shaft magnet determinations to compute the precise angular position of the output shaft, —comparing the computed output shaft position with the input command, and—selecting and energizing selected motor windings to rotate the motor in response to said comparison and drive the output shaft towards the commanded position.

Those skilled in the art will readily devise alternate methods and algorithms in accordance with the invention for precisely computing and controlling the angular position of the output shaft by using the sensed angle of the output shaft magnet to obtain a coarse indication of the output shaft angle, and using the sensed angle of the motor shaft magnet to obtain a more accurate indication of output shaft angle, as compared to the sensed position of the output shaft, with an improvement in accuracy proportional to the gear ratio connecting the magnets. In general, these methods and algorithms will use the sensed angle of the output shaft to either determine the number of complete turns of the motor shaft and/or the total rotational angle of the motor shaft and/or output shaft associated therewith, or predict (or estimate) the rotational angle of the motor shaft between 0 and 360 degrees, and combine this turns or rotational angle information, or same divided by the gear ratio, with the sensed angle of the motor shaft divided by the gear ratio, to obtain a more precise indication of output shaft angle either directly therefrom or with a correction factor applied to the sensed angle of the output shaft.

If further improved accuracy in the sensed position of the motor shaft is desired, comparing the sensed motor shaft angle to a precision shaft angle calibration reference, and calculating and storing the error in a lookup table for use by the processor results in a corrected motor shaft sensed position, and enables the angle of the motor shaft to be calculated with an easily achievable small magnitude error on the order of ±0.5 degrees. This error correction data may be generated by, for example, (i) reading and storing the sensed and calculated shaft angles, as calculated from the arctangent function applied to the sensor output voltage signals, at small increments as the shaft is rotated through 360-degrees, (ii) reading and storing the shaft angle as measured by the output of a precision angular position sensor reference, (iii) computing the difference of the sensed angle calculated in the first step to that measured by the precision reference in the second step for specific increments of shaft rotation, (iv) storing these computed differences as an error correction table in a memory module communicating with the processor, and (v) utilizing the error correction tables to further correct the sensed angle of the motor shaft. In the above numerical example, if the sensed angle of the motor shaft is refined with stored motor shaft sensor error data to, for example, 26.0 (±1) degrees, then the angular position of the output shaft is more accurately computed at (3,266.0±1)/20=163.3±0.05 degrees. Alternately, application of error correction data to the sensed angle of the output shaft enables provision of a geartrain with a higher step-down ratio, resulting in improved accuracy in the computation of the output shaft angle.

If the input command 30 includes target output shaft 6 rotational speed and/or acceleration information, then the processor 9 is further programmed to calculate the precise angular speed and/or acceleration of the output shaft as generally described above, and to provide signals to the motor power controller 10 to drive the output shaft toward the desired speed and/or acceleration as well as to the desired angular position. Calculation of the sensed rotational speed and/or acceleration may be accomplished by the processor according known processes or algorithms from the sensed angular positions of the magnets. For example, calculation of the sensed rotational speeds of the motor shaft and output shaft may be implemented in the processor such as by filtering the sensed magnet position signals, obtaining data samples from these signals at a high frequency, and determining the angle difference between sampled data divided by the sampling period to calculate the rotational speed of the motor and output shaft. These sensed rotational speeds are then compared to calculate a correction factor that is applied to the sensed rotational speed of the output shaft magnet to compute a more precise determination of the rotational speed of the output shaft. Similarly, dividing sampled speed data over the sampling period will yield sensed accelerations for use computing the precise acceleration of the output shaft.

Figure 5:
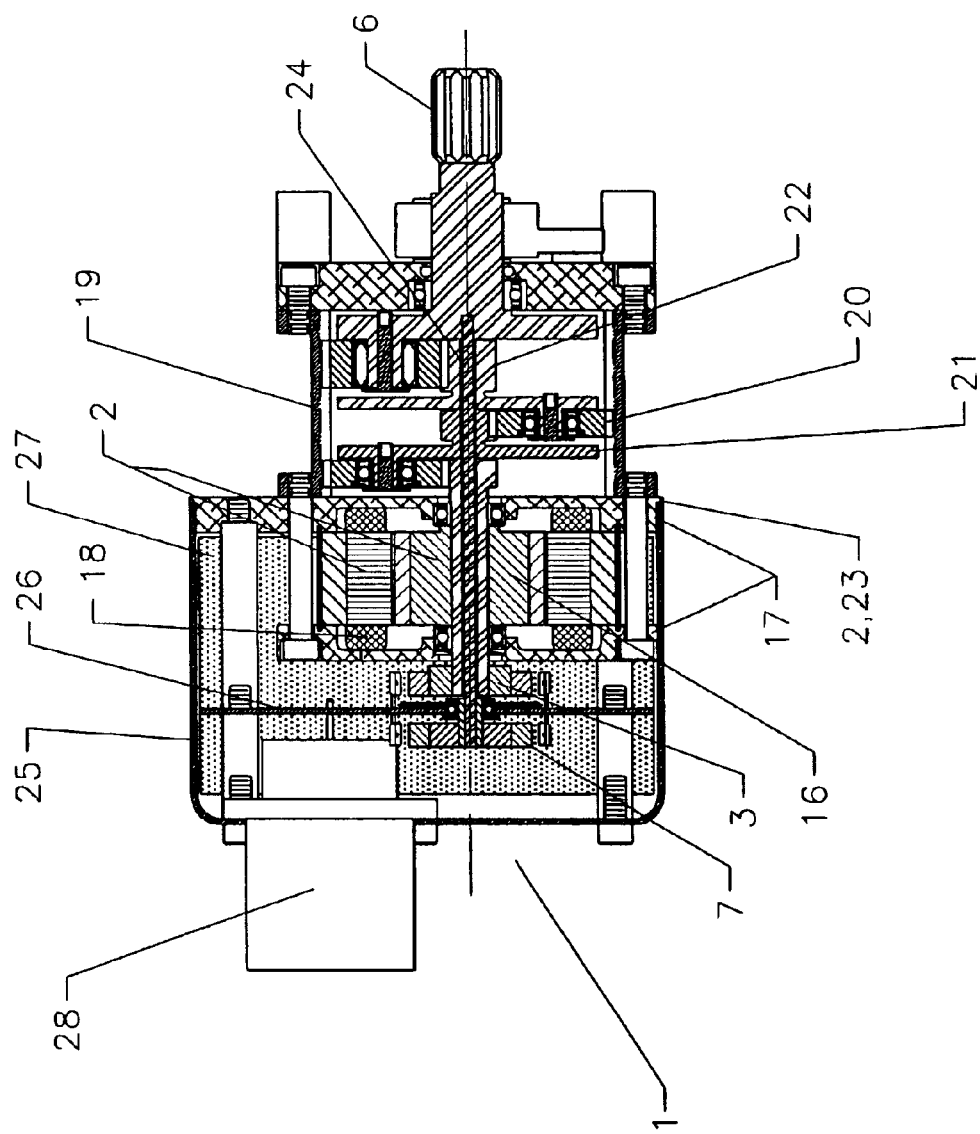
FIG. 5 is a longitudinal cross-sectional view of an electromechanical actuator embodiment in accordance with the invention including a brushless motor, electronic sensor assemblies for motor commutation and output shaft sensing, an interconnecting gear train, and an electronic motor controller.
Figure 5:
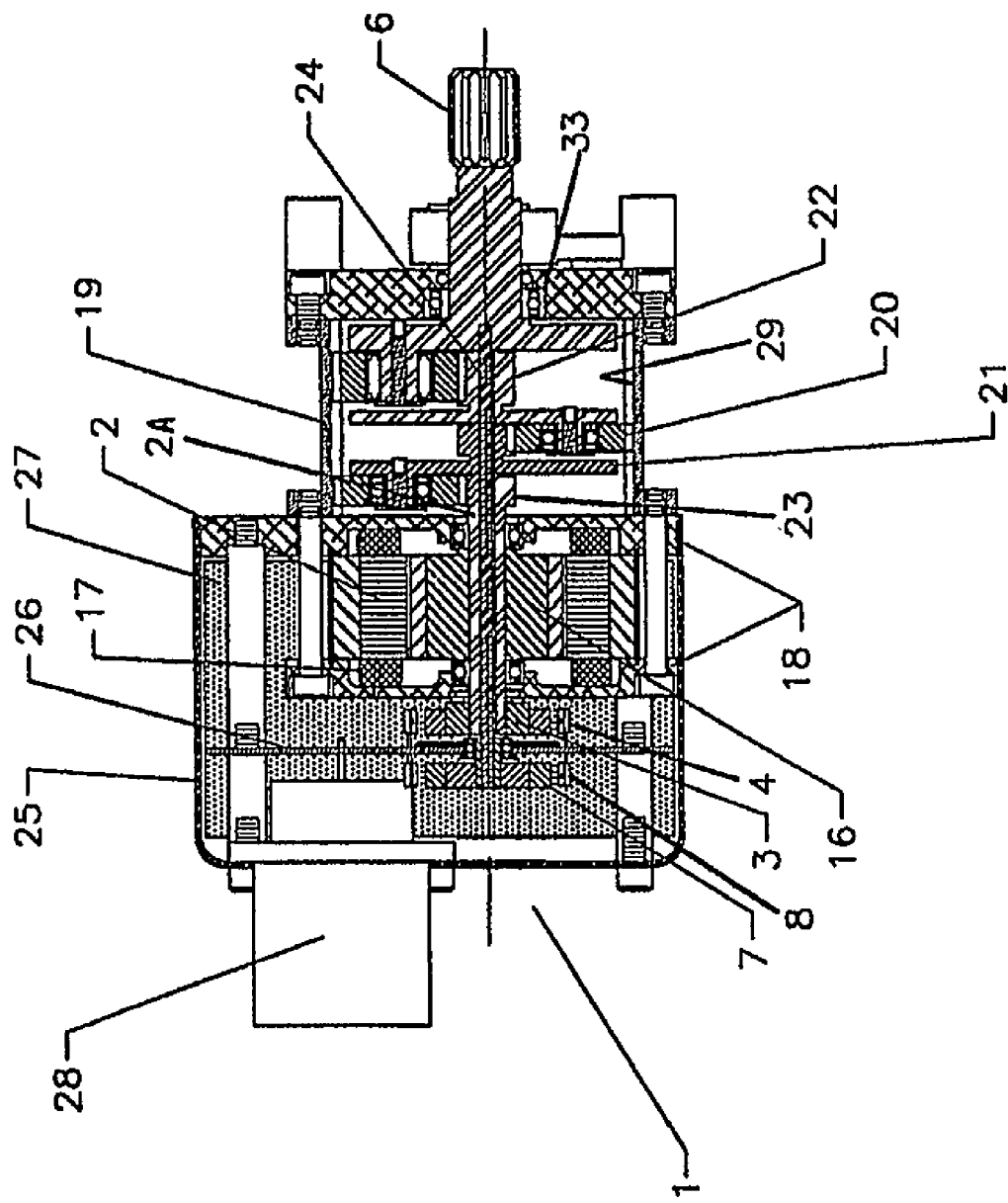

FIG. 5 shows a preferred embodiment electromechanical actuator 1 for precisely controlling the position of an output shaft 6 as described above. A brushless motor 2 includes a permanent magnet rotor 16, a three-phase stator 17, and a housing 18 which is attached to the end of a gear housing 19. The geartrain is of the in-line simple planetary type and the gear housing includes an integral internal ring gear 29. The geartrain also includes multiple reducing stages consisting of planet gears 20, carriers 21, and sun gears 22. The motor shaft magnet 3 and motor pinion gear 23 are attached to the motor shaft 2A. The rotatable elements of the actuator are supported on bearings 33. To provide a compact, integrated sensor and controller electronics package, the output shaft magnet 7 is attached to the output shaft 6 by a rod 24 which passes through the center of the motor shaft 2A and cannulated geartrain 5. The output sensor magnet 7 is located in the controller housing 25. The Hall-effect device sensors 4 and 8 for the motor and output shaft magnets are connected to and located on opposite sides of a common sensor printed circuit board 26. The sensors are shielded from external magnetic fields such as by the steel housing structure of the actuator. The processor and motor controller circuit modules are located on a second printed circuit board 27 which is heat sunk to the motor and controller housing 25. An electrical connector 28 provides for power, ground, and command signal connectors, and optional return signals indicative of the angular position of the output shaft or other operational parameters of the actuator as desired.

From the foregoing, it will be apparent that the present invention brings to the art a new electromechanical actuator that is uniquely configured to control the angular position of a rotatable output shaft. Provision of a brushless motor and simple contactless motor communication and output shaft position sensing elements results in a high-reliability actuator that is robust and compact in design, while utilizing standard configuration components. The invention also brings to the improved methods for precisely computing and controlling the angular position of the output shaft as a function of the sensed rotational angle of the output shaft, the sensed rotation angle of the motor shaft, and the gear ratio of the actuator geartrain therebetween. Using these unique algorithms, the position of the output shaft can be easily computed to an accuracy of, for example, ±0.05 degrees over full 360 degrees rotation from conventional sensor elements having an accuracy on the order of ±2 degrees

We claim:

1. A contactless electromechanical actuator comprising:
   a) an electric brushless motor with a rotatable motor shaft;
   b) a rotable output shaft;
   c) first and second magnets connected for rotation with the motor shaft and output shaft, respectively;
   d) a geartrain (i) coupled for torque amplification from the motor shaft to the output shaft, and (ii) having a step-down ratio coupling the first magnet to the second magnet;
   e) magnetic field sensors (i) positioned for sensing the magnetic fields of the magnets, and (ii) providing output signals indicative of the magnetic fields sensed;
   f) a processor module receiving said output signals, and operative to (i) calculate the rotational angles of the magnets therefrom, and (ii) compute the angular position of the output shaft as a function of said rotational angles and the step-down ratio, wherein the rotational angle of the second magnet provides a coarse indication of the angular position of the output shaft, and the rotational angle of the first magnet divided by the gear ratio provides a refined indication of the angular position of the output shaft; and
   g) a motor control module responsive to the computed angular position of the output shaft to commutate the motor and control the angular position of the output shaft.

2. The actuator as defined in claim 1 in which the magnets are each provided with two poles that rotate about the magnet's center axis to establish a periodic variation in magnetic field intensity as the magnets rotate.

3. The actuator as defined in claim 2 in which (a) the magnets are annular in shape, and are each provided with two poles spaced 180 degrees apart; (b) the magnetic field sensors each comprise a pair of magnetic field sensor elements associated with each of the magnets, the sensor elements of each pair (i) being positioned for sensing different components of the magnetic fields, and (ii) having output signals indicative of the component strength of the magnetic field sensed; and (c) the processor module is operative to calculate the rotational angles of the magnets according to a relationship between the ratio of the output signals from the sensor elements of each pair.

4. The actuator as defined in claim 3 in which the sensor elements of each pair comprise ratiometric Hall-effect devices positioned for sensing orthogonal non-saturating components of the magnetic fields and providing periodic output signals phase shifted 90 degrees apart as the magnets rotate.

5. The actuator as defined in claim 4 further comprising an additional pair of ratiometric Hall-effect devices positioned for sensing orthogonal non-saturating components of the magnetic fields and providing redundant periodic output signals phase shifted 90 degrees apart as the magnets rotate.

6. The actuator as defined in claim 3 in which the sensor elements of each pair comprise magnetoresistive bridge sensor elements having magnetically sensitive axes positioned for sensing orthogonal non-saturating components of the magnetic fields and providing periodic output signals phase shifted 90 degrees apart as the magnets rotate.

7. The actuator as defined in claim 1 in which the step-down ratio is an integer ratio.

8. The actuator as defined in claim 1 in which the geartrain comprises a multiple-stage planetary geartrain.

9. The actuator as defined in claim 8 in which the geartrain includes first and second sides, the motor and magnets are located on said first side and the output shaft is located on said second side, and the actuator further comprises a center shaft passing therethrough and connected between the output shaft and the second magnet.

10. The actuator as defined in claim 1 in which the processor module obtains a rotational angle of the first magnet from the calculated rotational angle of the second magnet multiplied by the step-down ratio, and uses the obtained rotational angle of the first magnet in computing the angular position of the output shaft.

11. The actuator as defined in claim 10 in which the processor module compares the obtained and calculated rotational angles of the first magnet, and uses the comparison divided by a function of the step-down ratio in computing the angular position of the output shaft.

12. The actuator as defined in claim 11 in which the processor module uses said comparison divided by said step-down ratio function to obtain the complete turns of the first magnet, and applies said complete turns divided by the step-down ratio and the calculated rotational angle of the first magnet divided the step-down ratio in computing the angular position of the output shaft.

13. The actuator as defined in claim 11 in which the processor module uses said comparison divided by said step-down ratio function to obtain a second-magnet error correction angle, and applies the error correction angle to the calculated rotational angle of the second magnet in computing the angular position of the output shaft.

14. The actuator as defined in claim 1 further comprising a memory storage module containing motor shaft angle error correction data, and in which the processor module computes the angular position of the output shaft as a further function of the stored error correction data.

15. The actuator as defined in claim 1 in which the processor module is operative to compare an input command signal with the computed angular position of the output shaft, and the control module is responsive to said comparison to commutate the motor and control the angular position of the output shaft.

16. The actuator as defined in claim 1 in which the processor module is further operative to calculate time derivatives of the rotational angles of the magnets from said output signals, and compute an associated time derivative of the angular position of the output shaft as a function of the time derivatives of said rotational angles and the step-down ratio, wherein the time derivative of the rotational angle of the second magnet provides a coarse indication of the time derivative of the output shaft, and the time derivative of the rotational angle of the first magnet divided by the gear ratio provides a refined indication of the time derivative of the output shaft; and in which the motor control module is further responsive to the computed time derivative of the angular position of the output shaft to commute the motor and control said time derivative of the output shaft.

17. A contactless electromechanical actuator comprising:
a) an electric brushless motor with a rotatable motor shaft;
b) a rotable output shaft;
c) first and second annular magnets connected for rotation with the motor shaft and output shaft, respectively, the magnets each having two poles 180 degrees apart that establish a sinusoidal variation in magnetic field intensity as the magnets rotate;
d) a geartrain (i) coupled for torque amplification from the motor shaft to the output shaft, and (ii) having a step-down ratio coupling the first magnet to the second magnet;
e) first and second pairs of magnetic field sensor elements positioned to sense the magnetic fields of the first and second magnets, respectively, —the magnetic field sensor elements of each pair
 i) being positioned to sense orthogonal non-saturating components of the magnetic fields, and
 ii) providing output signals proportional to the strength of the magnetic fields sensed and phase shifted 90 degrees;
f) a processor module receiving said output signals and an input command signal, and operative to
 i) calculate the rotational angles of the magnets from the 90 degree out-of-phase signals from the sensor elements of each pair,
 ii) obtain a rotational angle of the first magnet from the calculated rotational angle of the second magnet multiplied by the step-down ratio,
 iii) compute the angular position of the output shaft as a function of the obtained rotational angle of the first magnet, and the calculated rotational angle of the first magnet divided by the step-down ratio, and
 iv) compare the computed angular position of the output shaft with the input command signal; and
g) a motor control module responsive to said comparison to commutate the motor and control the angular position of the output shaft.

18. The actuator as defined in claim 17 in which the processor is operative to obtain a full-turn rotational angle of the first magnet from the rotational angle of the second magnet multiplied by the step-down ratio.

19. The actuator as defined in claim 17 in which the processor is operative to obtain a fractional-turn rotational angle of the first magnet from the rotational angle of the second magnet multiplied by the step-down ratio.

20. A contactless electromechanical actuator comprising:
a) an electric brushless motor with
 i) first and second sides, and
 ii) a rotatable motor shaft extending between said first and second sides;
b) a rotatable output shaft extending coaxial with the motor shaft between said first and second sides of the motor;
c) a geartrain
 i) coupled between the motor shaft and the output shaft on the second side of the motor, and
 ii) having a step-down gear ratio for torque amplification from the motor shaft to the output shaft;

d) first and second annular magnets
  i) located on the first side of the motor;
  ii) secured concentric around said motor shaft and said output shaft, respectively, for rotation therewith, and
  iii) each having two poles 180 degrees apart to establish a periodic variation in magnetic field intensity as the magnet rotates with its associated shaft;
e) first and second pairs of magnetic field sensor elements positioned to sense the magnetic fields of the first and second magnets, respectively, —the sensor elements of each pair.
  i) being positioned to sense orthogonal non-saturating components of the associated magnetic field, and
  ii) providing 90 degree phase shifted output signals proportional to the strength of the magnetic fields sensed;
f) a processor module receiving said output signals and operative to
  i) calculate the rotational angles of each magnet according to the ratio of the 90 degree phase-shifted signals from the sensor elements of each pair, and
  ii) compute the angular position of the output shaft as a function of the rotational angles of the magnets, wherein the rotational angle of the second magnet provides a coarse indication of the angular position of the output shaft, and the rotational angle of the first magnet divided by the gear ratio provides a refined indication of the angular position of the output shaft, and
g) a motor control module responsive to the computed angular position of the output shaft to commutate the motor and control the angular position of the output shaft.

21. The actuator as defined in claim 20 in which the geartrain comprises a multiple-stage planetary geartrain, and the output shaft passes through the center of the geartrain.

22. A method for controlling a rotatable output shaft of an electromechanical actuator, the method comprising the steps of
a) providing:
  i) said actuator having:
    a) said rotatable output shaft,
    b) an electric brushless motor with motor windings and a rotatable motor shaft, and
    c) a geartrain for torque transmission from the motor shaft to the output shaft, the geartrain having step-down gear ratio that divides the rotation of the output shaft into rotational segments having an angular measure equal to 360 degrees divided by the step-down ratio of the geartrain, each angular segment being associated with a full rotation of the motor shaft through said gear ratio,
    d) first and second annular magnets connected to rotation with the motor shaft and output shaft, respectfully, the magnets each having two poles that establish a periodic magnet field intensity as the magnets rotate, and
    e) first and second magnetic field sensor sets positioned to sense the magnetic fields of the first and second magnets, respectfully, the first magnetic field sensor set providing a first sinusoidal signal indicative of the rotational angle of the motor shaft between 0 and 360 degrees rotation, and the second magnetic field sensor set providing a second sinusoidal signal indicative of the rotational angle of the output shaft between 0 and 360 degrees rotation, and
  ii) an input command signal;
b) determining
  i) in which one of the segments the output shaft is in from the second signal, and
  ii) the angular position of the output shaft in said one segment from the first signal;
c) combining the information from said determining step as to said one segment and the angular position of the output shaft therein to obtain a corrected signal accurately indicative of the angular position of the output shaft;
d) comparing the corrected signal with the input command signal; and
e) selecting and energizing selected motor windings to rotate the motor shaft and output shaft in response to said comparison and rotate the output shaft towards the input command signal.

* * * * *

UNITED STATES PATENT AND TRADEMARK OFFICE
CERTIFICATE OF CORRECTION

PATENT NO. : 6,791,219 B1
DATED : September 14, 2004
INVENTOR(S) : Eric et al.

It is certified that error appears in the above-identified patent and that said Letters Patent is hereby corrected as shown below:

<u>Title page,</u>
Item [12], change "Eric et al." to -- Seger et al. --.
Item [75], Inventors, "Seger Eric" should read -- Eric Seger --; and "Frederick L. Gary" should read -- Gary L. Frederick --.

Signed and Sealed this

Fifth Day of July, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,791,219 B1 | |
| APPLICATION NO. | : 10/464684 | |
| DATED | : September 14, 2004 | |
| INVENTOR(S) | : Seger et al. | |

It is certified that error appears in the above-identified patent and that said Letters Patent is hereby corrected as shown below:

THE TITLE PAGE SHOWING ILLUSTRATIVE FIGURE, SHOULD BE DELETED AND SUBSTITUTE THEREFORE THE ATTACHED TITLE PAGE

DELETE DRAWING SHEET 5 AND SUBSTITUTE THEREFORE THE DRAWING SHEET CONSISTING OF FIG 5 AS SHOWN ON THE ATTACHED PAGE.

Signed and Sealed this

Seventh Day of August, 2007

JON W. DUDAS
*Director of the United States Patent and Trademark Office*

(12) United States Patent
Eric et al.

(10) Patent No.: US 6,791,219 B1
(45) Date of Patent: Sep. 14, 2004

(54) CONTACTLESS ELECTRO-MECHANICAL ACTUATOR WITH COUPLED ELECTRONIC MOTOR COMMUTATION AND OUTPUT POSITION SENSORS

(75) Inventors: Seger Eric, Rockford, IL (US); Frederick L. Gary, Rockford, IL (US)

(73) Assignee: BVR Technologies Company, Rockford, IL (US)

(*) Notice: Subject to any disclaimer, the term of this patent is extended or adjusted under 35 U.S.C. 154(b) by 0 days.

(21) Appl. No.: 10/464,684

(22) Filed: Jun. 18, 2003

(51) Int. Cl.⁷ .................................................. H02K 7/00
(52) U.S. Cl. ................................... 310/68 B; 310/83
(58) Field of Search ........................... 310/68 B, 83, 310/68 R, 80, 75 R

(56) References Cited

U.S. PATENT DOCUMENTS

| | | | |
|---|---|---|---|
| 3,946,298 A | 3/1976 | van de Loo | 318/685 |
| 4,232,451 A | 11/1980 | Thomsen | 33/361 |
| 4,492,906 A * | 1/1985 | Goto et al. | 318/488 |
| 4,785,242 A * | 11/1988 | Vaidya et al. | 324/207.25 |
| 5,101,143 A | 3/1992 | Eba | 318/11 |
| 5,367,237 A | 11/1994 | Ring et al. | 318/616 |
| 5,422,551 A | 6/1995 | Takeda | 318/265 |
| 5,545,961 A | 8/1996 | Peter | 318/647 |
| 5,598,073 A | 1/1997 | Haas | 318/431 |
| 5,622,096 A | 4/1997 | Granberg | 92/5 R |
| 5,659,230 A | 8/1997 | Fukuoka | 318/256 |
| 5,990,586 A | 11/1999 | Milano | 310/75 R |
| 6,002,226 A | 12/1999 | Collier-Hallman | 318/639 |
| 6,091,220 A | 7/2000 | Redelberger | 318/653 |
| 6,097,123 A | 8/2000 | Weiss | 310/105 |
| 6,104,152 A | 8/2000 | Coles | 318/256 |
| 6,124,688 A | 9/2000 | Coles | 318/256 |
| 6,198,243 B1 | 3/2001 | Rümenich | 318/466 |
| 6,229,299 B1 | 5/2001 | Strashny | 324/174 |
| 6,408,573 B1 | 6/2002 | Fukumoto | 49/360 |
| 6,448,760 B1 | 9/2002 | Neumann | 324/207.2 |
| 6,480,130 B1 | 11/2002 | Hanson | 341/144 |

* cited by examiner

*Primary Examiner*—Dang Le
(74) *Attorney, Agent, or Firm*—Keith Frantz

(57) ABSTRACT

An electromechanical actuator includes a brushless motor driving an output shaft through a torque-amplifying geartrain. An integrated motor commutation sensor includes an annular, two-pole magnet rotating with the motor and two ratiometric Hall-effect sensors at right angles around the magnet. The sensor signals are utilized by a processor to compute motor angle over 360 degrees rotation. An integrated output position sensor includes a second annular magnet rotating with the output shaft, and a second pair of Hall-effect sensors providing signals to the processor for computation of output shaft absolute position. The commutation magnet angle is predicted from the output shaft position, and compared to the motor's sensed rotational angle. The difference is used to correct the output shaft sensed angle with improved accuracy proportional to the gear ratio. The processor also provides logic signals to control motor winding current and provide closed-loop control of actuator position.

22 Claims, 5 Drawing Sheets

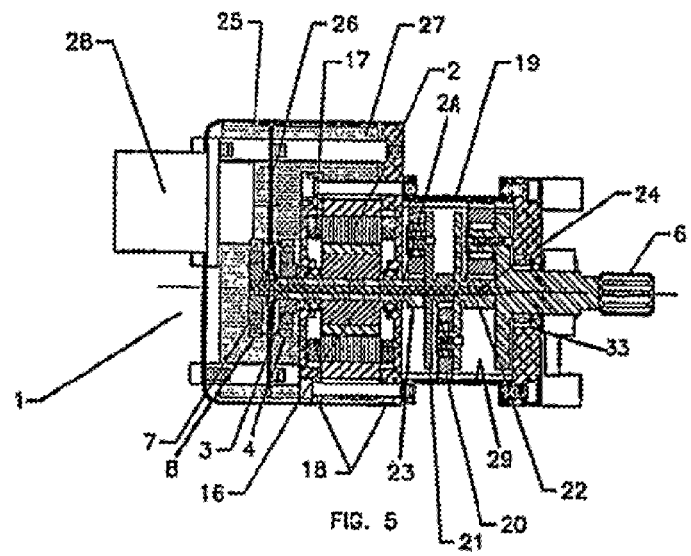

FIG. 5